May 20, 1969

R. S. QUINN 3,445,097

SAW HEAT TENSIONER

Filed Aug. 30, 1967

Reginald S. Quinn
Inventor by

Agent

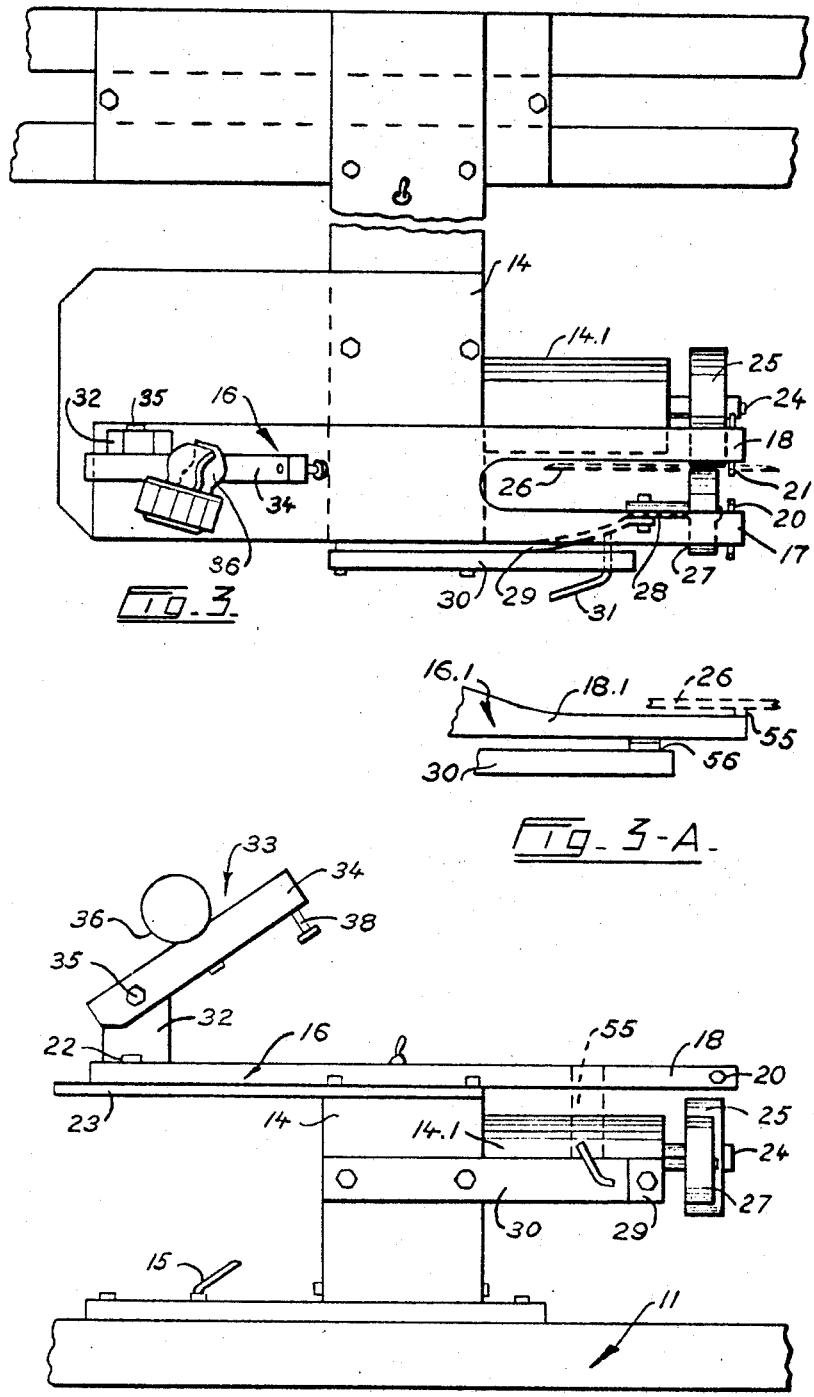

United States Patent Office 3,445,097
Patented May 20, 1969

3,445,097
SAW HEAT TENSIONER
Reginald S. Quinn, Vancouver, British Columbia, Canada, assignor to Redna Manufacturing Agency, West Vancouver, Canada, a sole proprietorship in British Columbia, Canada
Filed Aug. 30, 1967, Ser. No. 664,443
Int. Cl. B23d 59/00, 61/02
U.S. Cl. 263—4    14 Claims

ABSTRACT OF THE DISCLOSURE

A continuous method of heat tensioning a circular saw, heat applied simultaneously to each side of an annular zone of the saw whilst the saw is rotating at a constant slow speed, continuing the rotation and heating until tensioning is attained as evidenced by distinctive color of the zone. Apparatus having generally peripheral saw rotating means, and an oxyacetylene torch with two tips, flame from one tip directed to one side of the zone and from the other tip to the other side of the zone.

BACKGROUND OF THE INVENTION

The invention relates to a method and apparatus for heat shrinking, or tensioning, of circular saws.

In the art, heat tensioning is understood to mean shrinking by means of heat applied with an oxyacetylene torch, and it is known to use a torch to tension band, gang, and circular saws. United States Patent 2,209,674 issued in 1940 to Peter J. Burish, of Milton, Oregon, for a method of heat tensioning band saws, which method is distinguished by the application of heat from a mild flame, and air cooling the heated saw in sections, then intermittently advancing the saw for successive treatment in cycles, either manually or automatically.

In saw mill practice at Pacific Northwest mills, a cutting, or tooth, edge of a saw may travel at speeds ranging from 8,000 to 21,000 f.p.m. If cutting speeds are too fast for the machine, or saws are run when they are too dull, a cutting pressure can build up until it becomes too much for the steel, and so stretches it beyond the elastic limit. The use of heat tensioning to reduce the above and other difficulties is well known in the art, and need not further be described.

For many years band saws particularly have been and sometimes still are, tensioned with a hammer and stretcher rolls. Early heat tensioning was effected manually with a torch, by a spotting or with a brushing action. An improvement was provision of a welding torch in the shape of a horseshoe, with burner tips at each end. The torch was fastened to a saw clamp adjacent a grinder and, as the grinder moved the saw, burner tips on either side of the saw heated the steel to the desired color so effecting heat tensioning. The tension so produced was not uniform, which non-uniformity had obvious disadvantages.

OUTLINE OF THE INVENTION

The present invention provides a continuous method of heat tensioning circular saws to produce an annular heat line, hereinafter referred to as annular zone, the annular zone having substantially uniform heat tensioning, together with apparatus particularly adapted to the method.

This is accomplished by providing heat source, directing heat to opposite surfaces of the zone, whilst at the same time providing uniform peripheral motion between the zone and the heat source, so that both sides of a segment of the zone approaching the tip will be heated to a temperature as the segment approaches and is directly impinged by a flame brush from each tip, and cools as it moves away from the flame brushes. It is seen that this continuous action will produce an annular zone of effectively uniform tensioning. With proper heat and speed, the zone will blue after two revolutions.

As is well known in the art, an acetylene torch can produce a carbonizing flame having a temperature of about 5850° F., a neutral flame having a temperature of about 5850° F., and an oxidizing flame of some 6000° F. A carbonizing flame, with about a quarter of an inch of brush is recommended for heat tensioning according to the present process, but with higher relative peripheral speeds a neutral flame can be used. The optimum relative peripheral speed is from 3 or 4 feet per minute; up to about 7 or 8 feet per minute can be used. For a saw of particular dimensions, the actual speed which is optimum in a particular case is a function of parameters such as, temperature of the flame, position of a tip of the brush relative to the surface of the saw, and of other factors. Color is a reliable guide, and thus in practice one or more of the above parameters can be varied to produce the desired color.

Apparatus embodying the method includes a shaft mounted transverse of a flame, the shaft being obviously journalled suitably in pillow blocks of the frame. The saw is mounted on the shaft, and centered thereto. A drive wheel, mounted on a carriage movable of the frame, is adapted to be in peripheral contact with a side surface of the saw, an idle wheel being provided to bear against an opposite side surface so that rotation of the drive wheel rotates the saw, the carriage being slidable of the frame to adjust the position of the drive wheel suitably according to saw diameter, that is to say somewhat clear of roots of the saw teeth. Means are provided for the idle wheel to be adjusted to bear against the surface of the saw with such force as is necessary to effect driving. Obvious means are provided to rotate the drive wheel at a peripheral speed within the range given above.

Burner tips are carried at outer ends of a horseshoe shaped line, and means are provided to adjust the position and the orientation of the burner tips with respect to opposite faces of the saw so that the flame from each tip plays on an opposite side of the annular zone aforesaid.

DESCRIPTION OF THE DRAWINGS

FIG. 3 is a fragmented top plan of FIG. 2 showing saw drive means, the torch having been moved, FIG. 3A shows an alternative to spaced arms and bolt adjustment means, FIG. 4 is a side elevation of FIG. 3.

Figure 1:
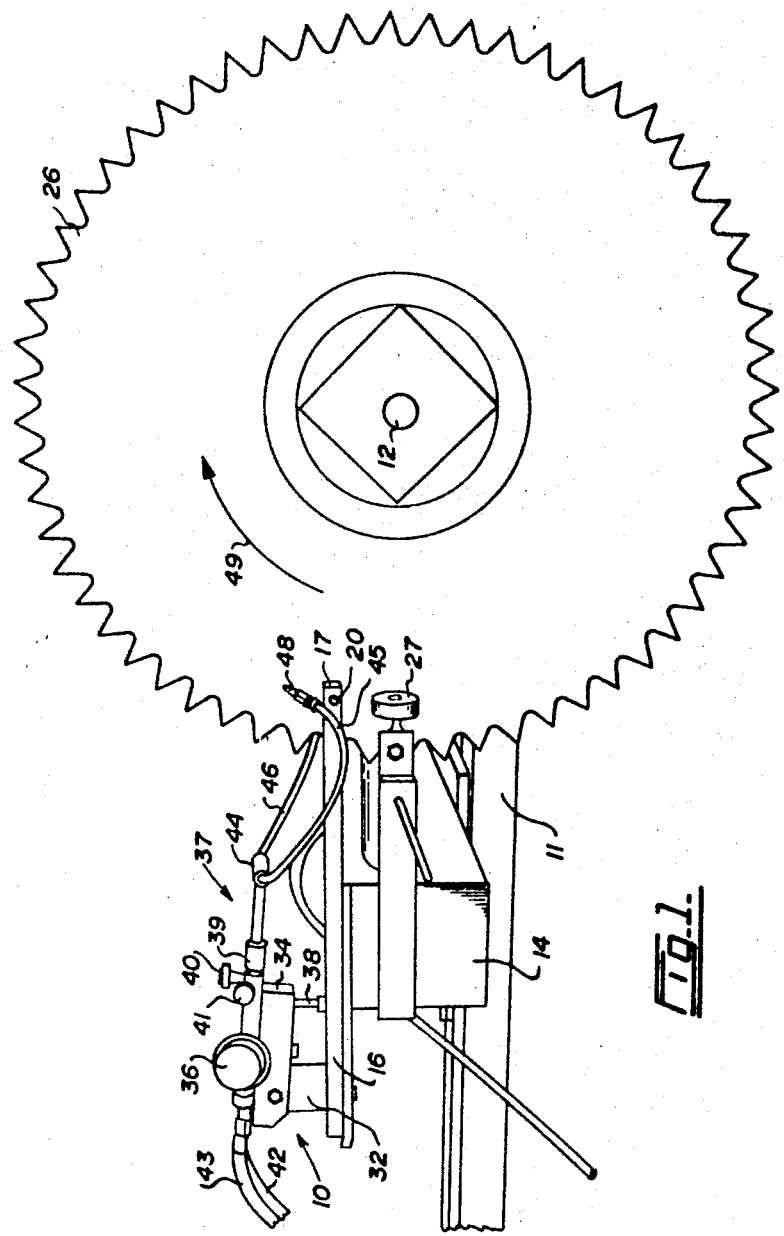
FIG. 1 is a perspective view of an apparatus according to the invention, shown with the saw mounted and the burner tips in an operating position.

The figures, and detail description below, are given by way of example and as showing preferred embodiment, it is to be understood that the invention can be expressed in apparatus other than that particularly described and illustrated.

DESCRIPTION OF THE FIGURES

The numeral 10 indicates the apparatus generally, having a frame 11 with a transverse shaft 12 mounted adjacent an outer end of the frame in pillow blocks 13. A carriage 14 is slidable longitudinally of the frame, and is securable thereto in a required position by obvious means 15 best seen in FIG. 4.

An upper plate 16 is mounted on an upper face of the carriage 14, the plate having spaced parallel arms 17, 18, at an end thereof adjacent the saw.

Horizontally disposed bolt adjustment means 20 and 21 are provided adjacent outer ends of each arm, and are adapted for adjustment so that a space between inner ends of the bolts just accommodates the saw centrally between the arms. The upper plate 16 is pivoted as seen at 22, FIG. 4, to a plate 23 secured to the carriage 14.

Referring particularly to FIGS. 3 and 4, a drive shaft 24 is journalled in an outwardly extending housing 14.1 of the carriage 14, a drive wheel 25 being secured to the shaft 24. A saw 26 being secured to the transverse shaft 12 as seen in FIG. 1, in a manner later to be explained, side surfaces of the saw are normal to the shaft, and it is seen in FIG. 3 that the shaft 24 is disposed so that the periphery of the drive wheel 25 touches a side surface of the saw. An idle wheel 27 is journalled on a short shaft 28 attached to an outer end of a spring strip 29, an inner end of which is secured to the carriage 14. An arm 30 is also secured to the carriage, the arm having a screw adjustment means 31, an inner end of which bears against the spring strip 29 so that, when the screw adjustment means 31 is tightened, the idle wheel urges the saw against the drive wheel 25, with pressure sufficient for the drive wheel to rotate the saw. The idle wheel is suitably a common ball bearing say 1″ or 1.5″ O.D.

The drive wheel may e.g., be of soft metal, wood, or plastic, but I find that stock abrasive wheels of 2 inch nominal O.D. are satisfactory, being cheap, readily obtainable, and accurately circular. Drive is directly from an output shaft of a stock shaded pole gear-motor, the speed of the motor output shaft being such as to provide a peripheral speed of somewhat over 4 feet per minute.

An upright 32 is secured to the upper plate 16 adjacent the pivot 22. An adjustable securing means indicated generally by the numeral 33 has an arm 34 an inner end of which is journalled to the upright as seen at 35, so that the arm is swingable in a vertical plane, a torch clamp 36 securing a torch 37 seen in FIGS. 1 and 2 only. Referring to FIGS. 1 and 4, a stop screw 38 is provided at an outer end of the arm 34 so that when the torch is in an operative position as seen in FIG. 1, fine adjustment of the position of the torch tips relative to the saw surfaces can conveniently be made so that an annular zone at a required position is heated.

Figure 2:
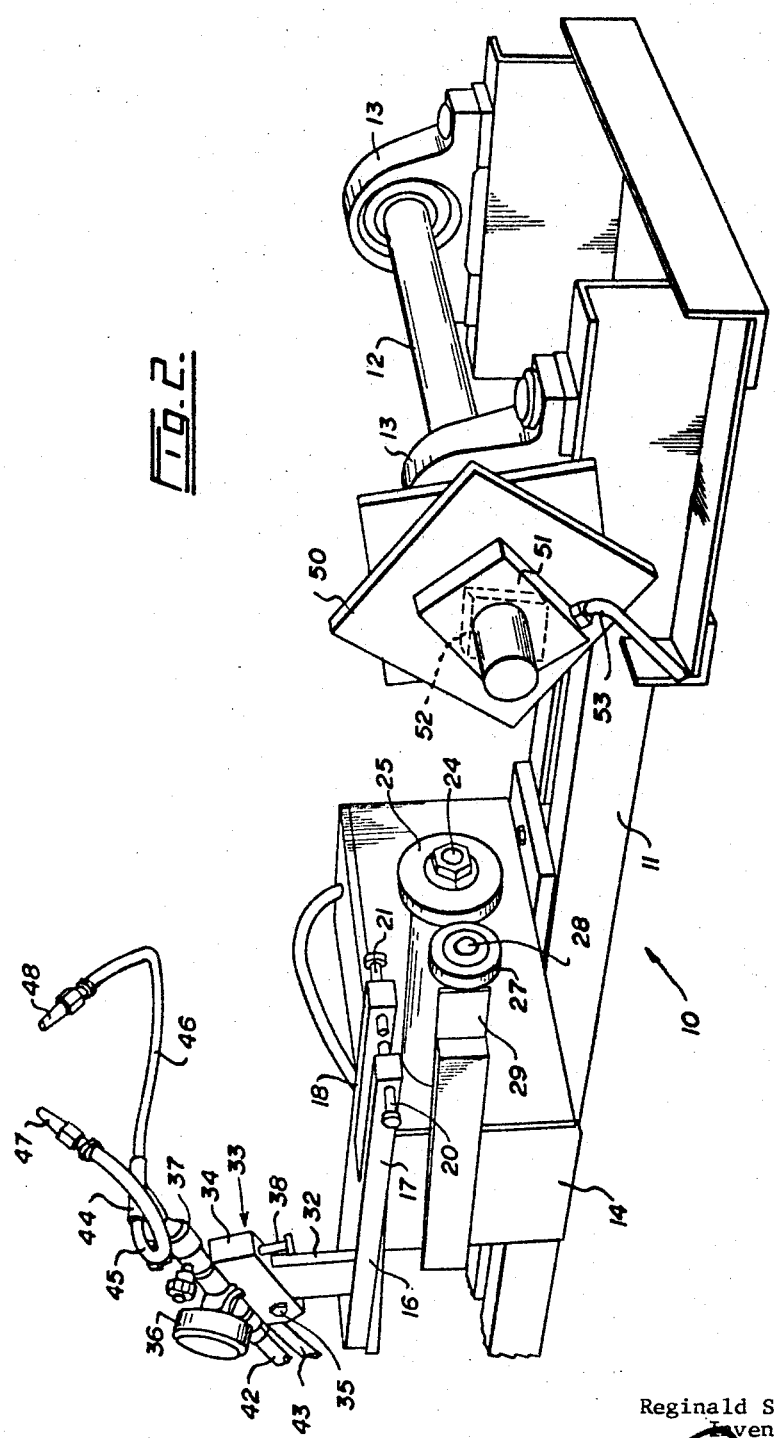
FIG. 2 is a perspective view of the apparatus of FIG. 1 with the saw removed and the burner tips in a disengaged position.

Referring to FIGS. 1 and 2, the torch 37 has conventional mixing means portion 39 including an oxygen valve 40 and an acetylene valve 41, supply of oxygen and acetylene being through flexible hoses 42 and 43. A T-fitting 44 at an outer end of the mixing means 39 supplies a mixture of oxygen and acetylene to each of two tubes 45 and 46 to outer ends of which are secured burner tips 47 and 48. Rotation of the saw being in a clockwise direction as indicated by an arrow 49, FIG. 1, the two tubes are disposed at outer ends of a generally horseshoe shaped configuration with the tips pointing to direct the flame obliquely upwards against inner and outer surfaces of the saw as illustrated.

The torch 37 being secured in the torch clamp 36, may be moved inwards and outwards to set the position of the burner tips with respect to throats of teeth of the saw so that the required annulus is heated. Initially, the two tubes 45 and 46 may readily be bent to provide the required position and orientation of the burner tips so that the flame brush is directed against the required annular zone, and at a desired angle thereto. The annular zone should be 2⅝″ to 2¾″ behind tooth gullets. The flame does not impinge normal to the side surfaces, but makes an acute angle thereto as seen in FIGS. 1 and 2. The acute angle is suitably about 45°, with the tips pointing upwards from such a position that the flame brushes just touch the said surfaces.

Referring to FIG. 2, the shaft 12 has a shoulder against which an inner arbor plate 50 bears, an outer arbor plate 51 is provided with obvious securing means 53. A spacing bushing 52, indicated in broken outline in FIG. 2 only, has a thickness according to the thickness of the saw to be sharpened, and a dimension to fit the saw arbor. The saw with the bushing in place, is mounted to the shaft 12 and the outer bushing 51 is pushed by hand inwards so that side surfaces of the saw are engaged by the inner and outer bushings with the spacing bushing in the arbor. In this position, a securing means 53 of the outer bushing is tightened to hold the assembly of bushings and saw in position so that the saw, now secured to the shaft, may revolve freely. The arbor plates position the saw, whilst allowing it to bend and twist from heat strain.

OPERATION

According to common practice, a saw should be firm, stiff, and without tension before heat tensioning. Before mounting the saw on the shaft as described above, the carriage 14 is moved away from the shaft, so that the drive wheel 25 and the idle wheel 27 will clear of the teeth of the saw when it is mounted. When the saw is mounted to the shaft, the carriage is moved inwards to a position such as shown in FIG. 1, and the screw adjusting means 31 tightened until adequate drive is obtained. Inserted tooth saws, and trim saws that are hooked beheind the eye, are mounted with the teeth pointing in a direction opposite to the rotation of the saw.

With the adjustable securing means 33 in the disengaged position as shown in FIGS. 2 and 3, the torch is mounted in the torch clamp 36 and moved and adjusted until the burner tips are directed so that the flame will impinge upon side surfaces of the saw as above described. When sliding the carriage 14 inwards, the bolt adjustment means 20 and 21 of the spaced arms 17 and 18 of FIG. 2 can be slacked off for free entry of the saw. Upon the carriage reaching the position shown in FIG. 1, the bolts 20 and 21 are adjusted just to clear side edges of the saw. The drive motor is now turned on to ensure that the drive is satisfactory, and that the saw tracks between the bolt adjustment means 20 and 21. Now, with the torch in the disengaged position, FIG. 2, it is lit and swung downwards to the FIG. 1 position. With the saw revolving, suitable adjustment of the oxygen and acetylene valves 40 and 41 is made so that the required color is obtained in the heated part of the annular zone.

The saw should be turned before lowering the lighted torch. Start the flame low enough that the heat will not color the saw. Gradually increase the flame until a light brown color is obtained. Where the brown color first appears put a chalk mark on the saw. The chalk mark should pass the flame two times. The saw will usually blue on the second turn. On some saws a third turn may be necessary to produce enough tension. When cold the saw should move about half an inch easily through the eye. The filer should decide how much tension his saws should carry. New saws can be heat tensioned before operation.

It is seen that apparatus as above described accomplishes heat tensioning according to the method as herein stated.

ALTERNATIVES

So far as the method is concerned, it is not of importance whether the torch be fixed and the saw rotating or whether the torch rotate with the saw being fixed. In tensioning circular saws, the former is more convenient mechanically. Gases other than oxygen and acetylene can be used but are not preferred.

It will be seen that a purpose of the spaced arms 17, 18, FIG. 3, together with bolt adjustment means 20, 21 is so that heat and other strain or distortion of the saw will not, as it rotates, alter the position of impingement of the flame brush on the saw sides because the upper plate 16, being pivoted at 22, the bolt adjustment means, and with them the burner tips, will follow such irrregularity. In FIG. 3A an upper plate 16.1 is generally similar to the upper plate 16, FIG. 3, but has only one arm 18.1, a boss 55 being provided at an outer end of this arm. A vertically disposed leaf spring 56 has a lower end secured to the arm 30, and extends upwards to bear against the arm 18.1 urging the boss 55 against the saw. The release spring 55 is shown in broken outline in FIG. 4. In this way, the upper plate 16.1, being pivoted as is the plate 16, will also follow irregularities of the saw as the boss 55 urged by the spring 56 will follow said irregularities.

I claim:
1. A method of heat tensioning a circular saw by
   (a) providing heat sources directing heat to opposite surfaces of a segment on annular zone of the saw,
   (b) and continuously causing constant relative peripheral motion between the annular zone and the heat sources so that the distance between heat sources and the segment decreases to a minimum and then increases, adapted to heat the segment as the distance decreases, and to permit the segment to cool as the distance increases,
   (c) and continuing the heating and motion until the annular zone has been heat tensioned as evidenced by a distinctive blue color thereof.
2. A method according to claim 1, the uniform peripheral speed being between 3 and 8 feet per minute.
3. A method according to claim 1, heat source being an oxy-acetylene torch, operated to produce flames having a temperature not lower than carbonizing and not higher than neutral, the flames being maintained at a constant distance from and orientation to surfaces of the annular zone.
4. A method according to claim 3, the uniform peripheral speed being 3 and 8 feet per minute.
5. Apparatus for heat tensioning circular saw, the apparatus including:
   (a) means to rotate the saw about a central axis normal to a surface thereof, imparting a constant peripheral speed to an annular zone of the saw, said means having
      a driving friction wheel and an idle wheel, adjoining peripheries of the wheels being spaced to accommodate the saw,
      means to adjust the space between the wheel peripheries so that the wheels are urged against opposite side surfaces of the saw with force such that rotation of the drive wheel effects rotation of the saw,
      means to secure a torch having burner tips supplied with oxy-acetylene gas, the means being adapted so that flames from the tips are directed to opposite sides of a segment of the annular zone.
6. Apparatus for heat tensioning a circular saw, the apparatus including:
   (a) means to rotate the saw about a central axis normal to a surface thereof, imparting a constant peripheral speed to an annular zone of the saw,
   (b) means to secure a torch having burner tips supplied with oxy-acetylene gas, the means being adapted so that flames from the tips are directed to opposite sides of a segment of the annular zone, said last mentioned means including
      a member pivoted to swing about a vertical axis of a carriage slidable of a frame of the apparatus,
      the pivoted member having a guide element, and means adapted for the guide element to bear against a surface of the saw adjacent the annulus to follow strain irregularities of the saw,
      means adjustably to secure the torch to the pivoted member so that the flames from the burner tips are directed as aforesaid at a selectively fixed distance from, and at selectively fixed orientation to, the annulus.
7. Structure according to claim 6, a transverse shaft rotatable of the central axis aforesaid, the shaft being journalled in the frame, and means to centre the saw on the shaft and to secure it thereto.
8. Structure according to claim 7 wherein
   (a) the peripheral speed of the annulus being from about 3 to about 8 feet per minute,
   (b) the means securing the saw to the shaft including an arbor bushing adapted to the thickness of the saw and the size of the arbor, an outer arbor plate slidable axially of the shaft, and means to secure the outer plate to the shaft with the saw urged against an inner arbor plate.
9. Structure according to claim 8 wherein the carriage is adjustably slidable of the frame to accommodate saws of different diameters.
10. Structure according to claim 6 wherein the means adapted for the guide element to bear against the saw includes a second guide element axially aligned with the guide element first aforesaid, and in adjustable spaced relation thereto.
11. Structure according to claim 9, wherein the means adapted for the guide element to bear against the saw includes a second guide element axially aligned with the guide element first aforesaid, and in adjustable spaced relation thereto.
12. Structure according to claim 6, the means adjustably securing the torch including a securing member mounted on the pivoted member, and adapted for swinging motion in a vertical plane between an operating position at which the burners direct flame to the annulus, and a disengaged position at which the burners are clear of the saw.
13. Structure according to claim 12, and adjustable stop means of the securing member selectively determining the operating position.
14. Structure according to claim 10; the means adjustably securing the burners including a securing member mounted on the pivoted member, and adapted for swinging motion in a vertical plane between an operating position at which the burners direct flame to the annulus, and a disengaged position at which the burners are clear of the saw; and adjustable stop means of the securing member selectively determining the operating position.

References Cited

UNITED STATES PATENTS 1,084,692   1/1914   Bucknam.
2,816,848   12/1957  Maxon.

JOHN J. CAMBY, *Primary Examiner.*

U.S. Cl. X.R.

148—130; 266—23